March 24, 1959 R. A. WALLACE 2,879,075
MOBILE AND STATIONARY FURNITURE SUPPORT
Filed Sept. 20, 1957 2 Sheets-Sheet 1
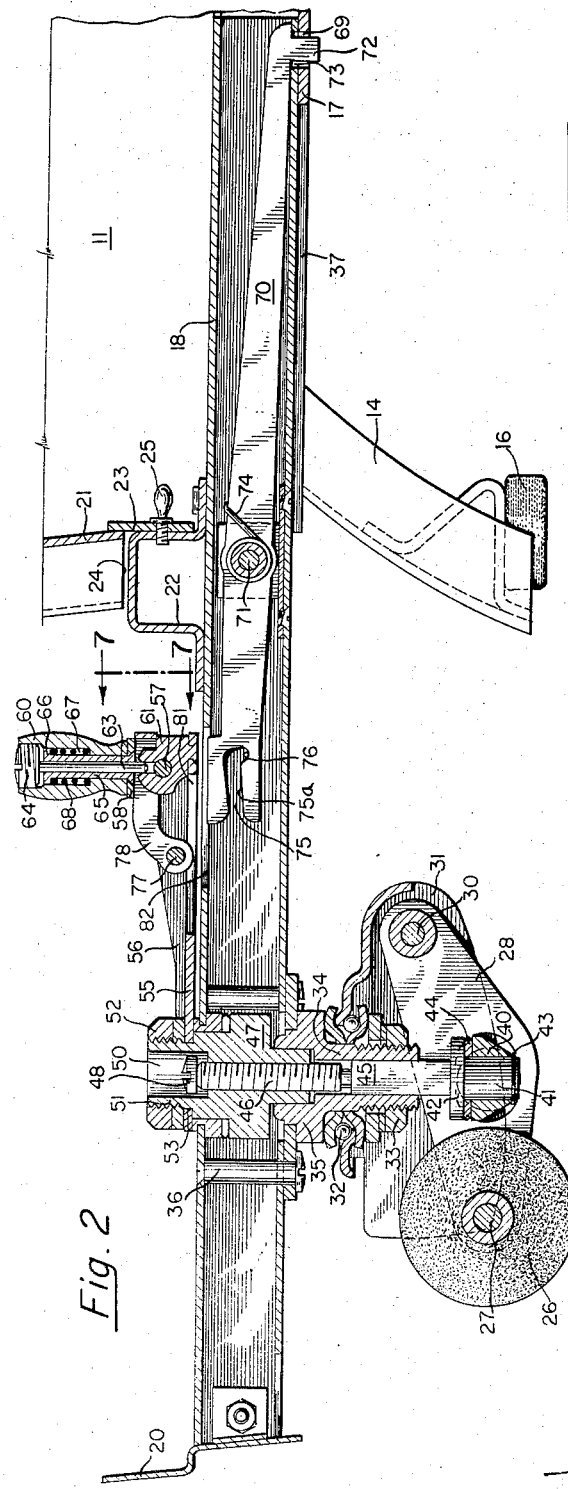
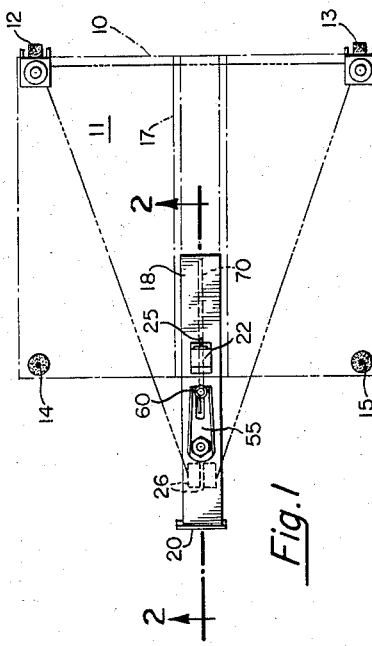
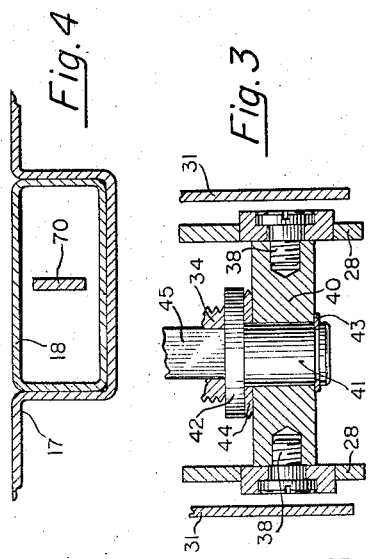
INVENTOR
RICHARD A. WALLACE
BY
AGENT March 24, 1959 — R. A. WALLACE — 2,879,075
MOBILE AND STATIONARY FURNITURE SUPPORT
Filed Sept. 20, 1957 — 2 Sheets-Sheet 2

INVENTOR
RICHARD A. WALLACE
BY
AGENT

United States Patent Office 2,879,075
Patented Mar. 24, 1959

2,879,075

MOBILE AND STATIONARY FURNITURE SUPPORT

Richard A. Wallace, Port Kennedy, Pa., assignor to Burroughs Corporation, Detroit, Mich., a corporation of Michigan Application September 20, 1957, Serial No. 685,158

8 Claims. (Cl. 280—44)

The present invention relates generally to furniture, and more particularly to a combined mobile and stationary support for relatively heavy equipment.

In supporting devices, such as tables, desks and the like, for calculating machines, typewriters and other devices manually operated by a single operator, it is often necessary to change the location of the supporting unit without disturbing the equipment mounted thereon and without means for wheeling the unit. This presents a troublesome situation because the mounted equipment is too heavy to be moved without calling upon extra help to do the moving, all resulting in a loss of time of the operator and machine work hours. Further, such lifting around of operating machines results in jars and shocks which disturb the delicately adjusted and inter-related parts of precision machines, so that improper functioning results.

It is an object of the present invention to provide a novel mechanism for transforming a normally stable support for heavy machines into a mobile unit which can be moved from one location to another with easy handling and without upsetting the mechanism of such machines.

Another object is to provide a four-legged stationary table with means for changing it into a three-wheeled mobile unit.

Another object is to provide an immobile table having two fixed legs and two wheeled legs with extensible caster means for raising said fixed legs and rendering said table mobile.

Still another object is to provide adjustable means arranged for telescopic assembly with a table for transforming it from a stationary unit to a mobile one including novel means for latching the assembly in either position.

A specific object of the invention is to provide a novel, vertically adjustable caster mechanism.

Still more specifically the invention has as an object to provide a caster assembly wherein the wheel element can be easily raised and lowered.

Generally the invention comprises a novel combination of parts including a caster carrying slide telescopically received into the body of a table or support and extended to a position where a caster can be fed into contact with the floor and thus elevate one side of the table, such side being normally supported by fixed legs while the opposite side is wheel supported. In extended position the slide is latched to prevent improper retraction while the table is being moved, and is also latched in its retracted position to prevent improper withdrawal.

Another important feature of the invention is the provision of a swiveled caster carried by a feed screw under control of a leader nut in combination with means for causing said screw to travel axially only whereby troublesome torque forces heretofore present in mechanism for raising and lowering caster assemblies have been eliminated.

In the accompanying drawings:

Fig. 1 is a plan view, partly in phantom, of a table embodying a controllable support embodying one form of the present invention;

Fig. 2 is a longitudinal section of the novel support taken along line 2—2 of Fig. 1 and as extended to form a mobile unit for an otherwise stationary table, the latter being fragmentary to show only coactive parts;

Fig. 3 is a structural sectional detail taken on line 3—3 of Fig. 5;

Fig. 4 is a structural sectional detail taken on line 4—4 of Fig. 5;

Figure 5:
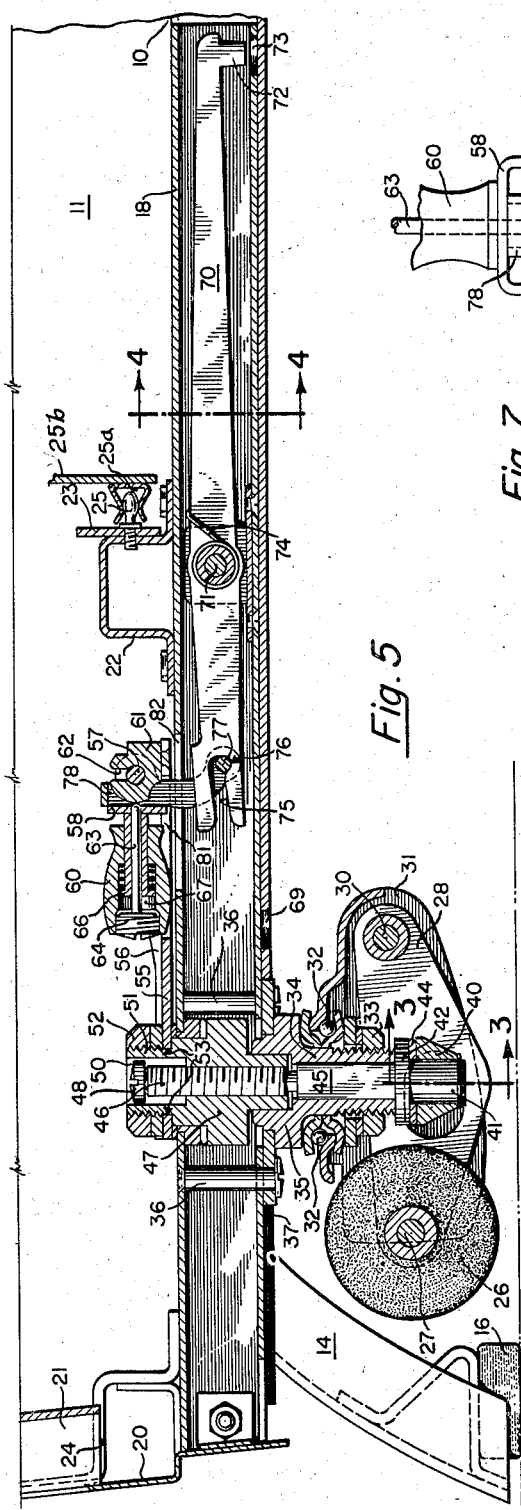
Fig. 5 is a section similar to Fig. 2 but showing the mobile unit retracted to transfer its support to the legs of the table.
Figure 7:
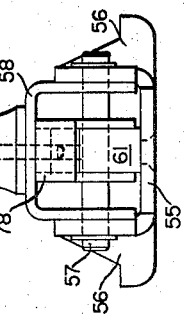
Fig. 7 is a fragmentary end view of the hand grip for the crank arm, on line 7—7 of Fig. 2.

Referring now more specifically to the details of the preferred embodiment of the invention as illustrated in the drawings, and more particularly to Fig. 1 thereof, it is seen that the bottom 10 of the table is provided with two casters 12 and 13 at the rear corners, and two fixed legs 14 and 15 at the front corners terminating respectively in friction pads 16. The pairs of casters and legs normally form a stable support for whatever is to be supported by the table. Specifically considered, the table may serve as a support for a tabulating or accounting machine, a typewriter, or any other relatively heavy equipment too heavy to be lifted or moved from one place to another without some auxiliary mobile means. The present invention provides mobile means enabling the table to be shifted to different locations rapidly and with little expenditure of energy.

In order to transform the desk or table from a fixed unit into a mobile unit, the bottom 10 of the table body is formed with a medially disposed depending channel 17, which serves as a guideway for a tubular rectangular member or slide 18 of a length to telescopically enter the channel 17 and be retracted therein so as not to project beyond the front of the table. This retracted position is defined by an upwardly extending limit stop 20 which follows the inward movement of the slide 18 until it abuts the channelled end plate 21 of the table frame, as seeen in Fig. 5. For limiting the outward movement of the slide 18 (Fig. 2), an inverted U-shaped bracket 22 is bolted, or otherwise made fast, to the top of the slide 18, and carries an upstanding limit stop 23 to engage the plate 21 where the slide has a through aperture 24 for the free movement of the slide but sufficiently narrow to be in the path of the stop 23.

A latch knob 25 is threaded through the arm 23 and bracket 22 and is received within a spring clip 25a mounted on fixed support structure 25b, when the slide is moved to its retracted position thus to releasably retain the apparatus in this position.

A pair of wheels 26 are rotatably mounted at the front in the left end of the assembly on an axle 27 carried by one end of a pair of spaced rocker arms 28, the opposite ends of which are pivotally mounted upon a pin 30. This pin 30 is fixed at its ends in an inverted U-shaped frame or housing 31 which is mounted for swivel action on a ball bearing race 32. The frame 31 straddles both the arms 28 and the wheels 26 to complete the swivelled portion of the caster assembly. The bearing 32 is supported by a collar 33 threaded upon the shank 34 which traverses the ball race of bearing 32 as an extension of a head 35 which is suitably fixed to the slide 18 as by rivets 36 or like fastening means. The head 35 and its attaching parts ride in a slot 37 in the bottom of the table frame when moving relative thereto.

Figure 6:
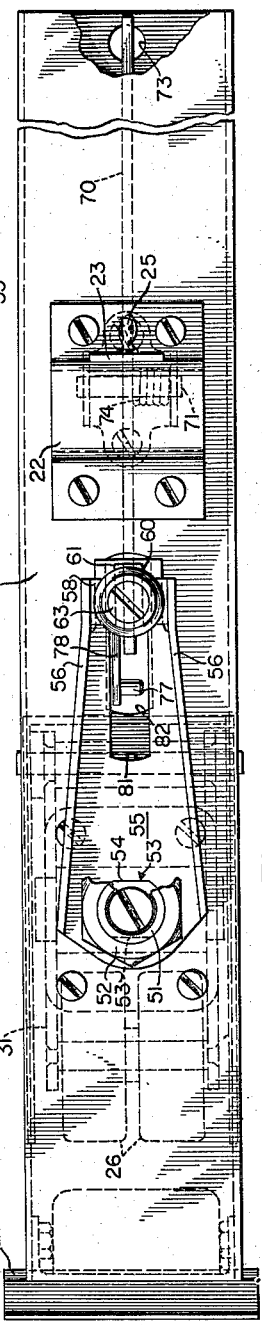
Fig. 6 is a plan of the retractable auxiliary support unit.

In order to raise and lower the caster assembly, the rocker arms 28 are connected by studs 38 (Fig. 3) to the ends of a cross-piece 40 having a central aperture to receive the lower end of a rod or shaft 41 having a flange 42 which serves to abut the end of the shank 34 as a limit stop in the elevated position of the caster assembly (Fig. 5). The end 41 projects through the cross-piece 40 with a circumferential groove to seat a retaining split ring 43. A thrust bearing 44 is preferably provided between the piece 40 and the flange 42. That portion 45 of the rod 41 above the flange 42 is preferably of square or polygonal section while the remaining portion 46 is a screw, threaded into a leader or nut 47. Broadly considered this interfitting of the section is a means for restricting the movement of the screw to a linear one only. The square section of the portion 45 rides in a complementally-shaped bore of the shank 34, while the upper end of the screw 46 terminates in a slotted head 48 within a bore 50 formed in the reduced end 51 of leader unit 47 which projects through the top of the slide 18. This end 51 is formed with an external thread to receive an anchoring nut 52, such thread terminating at its inner end adjacent to two diametrically disposed flats 53 (Fig. 6) so that this portion of the end 51 is complemental to a flat sided aperture 54 formed in a crank arm 55 whereby turning the arm 55 rotates the leader nut 47 to feed the screw of the lift rod to raise or lower the caster assembly. Particular attention is called to the novel feed screw 46 which includes a means, the polygonal portion 45, for preventing turning movement of the screw while being fed whereby the travel of the screw is linear only and otherwise inherent torsion forces are overcome and of no effect.

The crank arm 55 is formed with oppositely disposed upstanding flanges 56 which provide support for the ends of a pin 57 as a pivot for an inverted U-shaped base 58 to which a hand grip 60 is attached. When the slide 18 is withdrawn, as shown in Fig. 2, the hand grip 60 with its attached crank arm 55 can be rotated about the rod 41 as an axis to change the position of the wheels 26 relative to the surface beneath it. The pivotal mounting for the hand grip 60 makes possible unobstructed retraction of the slide 18 because it can be turned to a horizontal position enabling it to pass through the aperture 24 of the plate 21 along with the slide (see Fig. 5).

As a means to latch the hand grip 60 in its vertical position a detent block 61 is fixed to the arm 55 to lie medially of the legs of the base 56 and is transversely apertured for the passage of the pivot 57. The upper face of the block 61 is provided with a bore 62 in alinement with a latching plunger 63 axially traversing the grip 60 and depending from a head 64 which is threaded into the end of the grip 60. A sleeve 65 forms a guide for the plunger 63 and is attached at its lower end to the base 56, while its upper end terminates in a flange 66 which is located in a counter-bore 67 of the grip 60. This counter-bore 67 extends about the sleeve 65 and houses a compression spring 68 normally biasing grip 60 downwardly and thus plunger 63 is biased to latching position. When so latched the grip and crank arm 55 can move as a unitary structure.

For the purpose of locking the slide 18 in its extended position projecting from the body channel 17, as seen in Fig. 2, a latch lever 70 is pivoted on a horizontal axis pin 71 fixed transversely of the slide 18. The arms of the lever 70 have substantially a two-to-one ratio with the longer arm terminating adjacent the inner end of the slide in a latching lug 72 juxtaposed, as seen in Fig. 5, to an aperture 73 through the bottom of the slide, such aperture 73 when the slide is moved to extended position registering with an aperture 69 in bottom 10, whereby the spring 74, attached to pin 71 and having a portion overlying arm 70, snaps the leg 72 through both apertures to lock and prevent retraction of the slide. The opposite, or short arm of the lever 70 terminates in a slot 75 merging into a notch 76 dimensioned to seat a pin 77 projecting laterally from a keeper 78 which is pivotally mounted upon the pin 57. The base of the keeper 78 is bifurcated to straddle the block 61 while also seating against the grip base 58. The keeper 78 projects laterally to place pin 77 in position to enter slot 75 when grip or handle 60 is retracted.

To permit travel of keeper 78 from outside of the slide 18 to the interior thereof, a slot 81 is provided in crank arm 55 to register with a slot 82 in slide 18. Both slots 81 and 82 are located operatively with respect to the bifurcated end of the latch lever 70 so that the lug 77 moves accurately into the lever slot 75 and against its lower edge 75a thereby to rock the lever 70 downwardly into the detented position shown in Fig. 5.

Referring to Fig. 5, the slide 18 is shown in its normal, or retracted position with its caster retracted and the front legs 14 of the table resting on the floor thereby to provide a stable support for equipment carried by the table. In this retracted position the hand grip 60 is in its lowered, or retracted, position and keeper 78 is interlocked with the lever 70 at one end thereby to hold lug 72 retracted. Knob 25 is releasably retained in clip 25a to hold the slide against accidental displacement.

When it is desired to move the table to a new position, the slide 18 is withdrawn by an outward pull on the limit stop 20 until stopped by the stop 23, at which time the hand grip 60 is swung to a vertical position carrying keeper 78 with it whereupon the spring biased plunger 63 is projected into the block slot 62 to lock the parts as a unit. When so locked the grip 60 and crank arm 55 are rotated about the vertical axis to turn the leader nut 47 and thereby lower the wheel into contact with the floor. Turning of the crank arm 55 continues until the table legs 14 are elevated above the floor, thereby substituting the two-wheeled unit in place of the fixed legs and making the table a three-wheeled mobile unit. Rotation of the crank arm 55 is stopped with its keeper 78 in register with the slide slots 81 and 82 ready to be swung back when the slide is to be retracted. In this supporting position of the wheel 26 the lever 70 has been released to the action of its biasing spring 74 and the lug 72 is projected into the registering apertures 69 and 73 as an interlock.

While a preferred form of the invention has been shown and described it is obvious that it can be modified both as to construction and use and still remain within the inventive concept herein disclosed.

It will now be apparent that a novel mechanism has been devised for changing a normally stationary table or the like into a movable unit whereby it is possible to move the table from one location to the other with little effort and without requiring extra help usually necessary to lift a table having heavy equipment thereon, such as calculating machines or typewriters.

What is claimed is:

1. A support unit having a bottom with two pairs of legs at opposite sides respectively, one of said pairs being fixed and the other pair being wheels, a channel member open at one end and formed as a part of said bottom to extend substantially medially from one pair of legs to the other, said member having a slot opening into said open end, a tubular slide telescopically mounted in said channel member of a length to be withdrawn part way for supporting purposes, a caster assembly carried by said slide adjacent said channel open end and riding in said slot in retracted slide position, said assembly including arms rockable about a horizontal axis and a wheel carried by said arms, means for moving said arms to pressure said wheel against the floor to elevate said pair of fixed legs only and thereby form a three wheel support for the unit, and manually operated means for actuating said arm moving means.

2. A unit comprising a body, a pair of wheel legs mounted on one side of said body, a pair of fixed legs attached to the opposite side of said body, means including a slide telescopically mounted on said body to travel medially of said pairs, said slide having a length to be withdrawn part way as a supplemental support, means including a caster assembly mounted on said slide and operative in extended position of said slide, for lifting said fixed legs to form a three-wheeled unit, a manually operative crank arm for actuating said lifting means, and means latching said slide in extended supporting position.

3. A unit according to claim 2 wherein means also latches said slide in retracted position.

4. A unit according to claim 3 wherein means is carried by said crank arm for operating said extended position latch means.

5. A unit according to claim 4 wherein said extended position slide is a tube and said latch means is a pivoted link in said tube controlled by said crank arm.

6. A unit according to claim 5 wherein said lifting means is a feed screw and a leader nut.

7. A unit according to claim 6 wherein said crank arm is attached to said nut, and a hand grip is arranged to rotate said arm.

8. A unit according to claim 7 wherein said hand grip is collapsible to permit retraction of said slide.

References Cited in the file of this patent

UNITED STATES PATENTS

| | | |
|---|---|---|
| 554,832 | Partridge | Feb. 18, 1896 |
| 1,366,771 | Devencenzi | Jan. 25, 1921 |
| 1,482,527 | Simpson | Feb. 5, 1924 |
| 2,788,219 | McClellan | Apr. 9, 1957 |

FOREIGN PATENTS

| | | |
|---|---|---|
| 277,775 | Great Britain | Sept. 29, 1927 |